US012469634B2

(12) United States Patent
Yen et al.

(10) Patent No.: US 12,469,634 B2
(45) Date of Patent: Nov. 11, 2025

(54) TRANSFORMER DEVICE

(71) Applicant: REALTEK SEMICONDUCTOR CORPORATION, Hsinchu (TW)

(72) Inventors: Hsiao-Tsung Yen, Hsinchu (TW); Po-Chih Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 1029 days.

(21) Appl. No.: 17/513,919

(22) Filed: Oct. 29, 2021

(65) Prior Publication Data

US 2022/0157514 A1 May 19, 2022

Related U.S. Application Data

(60) Provisional application No. 63/115,073, filed on Nov. 18, 2020.

(30) Foreign Application Priority Data

Feb. 23, 2021 (TW) ................................ 110106259

(51) Int. Cl.
*H01F 27/29* (2006.01)
*H01F 27/40* (2006.01)

(52) U.S. Cl.
CPC ............. *H01F 27/29* (2013.01); *H01F 27/40* (2013.01)

(58) Field of Classification Search
CPC ......... H01F 17/0013; H01F 2027/2809; H01F 17/0006; H01F 27/2804; H01F 5/003; H01F 27/29; H01F 27/40
(Continued)

(56) References Cited

U.S. PATENT DOCUMENTS 7,675,365 B2 3/2010 Lee
8,198,970 B2 6/2012 Choi et al.
(Continued)

FOREIGN PATENT DOCUMENTS

CN 101242159 A 8/2008
CN 103377809 A 10/2013
CN 106710847 A * 5/2017

OTHER PUBLICATIONS

Yen et al., Transformer Device, U.S. Appl. No. 17/313,036, filed May 6, 2021 (YYYY-MM-DD)).
(Continued)

*Primary Examiner* — Tszfung J Chan
(74) *Attorney, Agent, or Firm* — WPAT, PC

(57) ABSTRACT

A transformer device includes first to third coils. The first coil includes first segments and a first connecting portion. The first segments are coupled to each other through the first connecting portion. The second coil includes second segments and second connecting portions. The second segments are coupled to each other through the second connecting portions. The third coil includes third segments and third connecting portions. The third segments form a ring structure through the third connecting portions, in order to couple the first coil and the second coil. A first portion of the first segments and a second portion of the second segments are arranged in a range of the ring structure, the first portion of the first segments is arranged in a range of the second coil, and the second portion of the second segments is arranged in a range of the first coil.

18 Claims, 8 Drawing Sheets

(58) Field of Classification Search
USPC .................................................. 336/200, 232
See application file for complete search history.

(56) References Cited

U.S. PATENT DOCUMENTS

| | | | | |
|---|---|---|---|---|
| 10,340,880 | B2 | 7/2019 | Yen | |
| 2003/0089963 | A1* | 5/2003 | Davies | H10D 1/20 257/E21.022 |
| 2007/0296537 | A1* | 12/2007 | Yoon | H01P 5/02 336/223 |
| 2010/0117737 | A1* | 5/2010 | Kondo | H03F 3/45179 330/276 |
| 2010/0148866 | A1* | 6/2010 | Lee | H03F 3/211 29/605 |
| 2011/0037555 | A1* | 2/2011 | Lai | H01F 27/2804 336/200 |
| 2013/0265132 | A1 | 10/2013 | Huang et al. | |
| 2016/0086725 | A1 | 3/2016 | Igarashi | |
| 2019/0109612 | A1* | 4/2019 | Robert | H01F 27/29 |

OTHER PUBLICATIONS

OA letter of a counterpart CN application (appl. No. 202110415860.1) mailed on Mar. 26, 2025.
OA letter of a counterpart CN application (appl. No. 202110425309.5) mailed on Mar. 20, 2025.

* cited by examiner

TRANSFORMER DEVICE

BACKGROUND OF THE DISCLOSURE

1. Field of the Disclosure

The present disclosure relates to a transformer device. More particularly, the present disclosure relates to a planar transformer device for power combination.

2. Description of Related Art

Certain integrated circuits (ICs) for radio frequency signals have to convert signals between a common mode and a differential mode. A BALUN is usually utilized in this kind of signal conversion. A BALUN is one of many applications of a transformer and is implemented with coil(s) in the ICs. Therefore, a good design for coils in terms of excellent coupling, higher quality factor, and improved line balancing becomes more and more significant.

SUMMARY

In some aspects, a transformer device includes a first coil, a second coil, and a third coil. The first coil includes a plurality of first segments and a first connecting portion. The plurality of first segments are coupled to each other through the first connecting portion. The second coil includes a plurality of second segments and a plurality of second connecting portions. The plurality of second segments are coupled to each other through the plurality of second connecting portions. The third coil includes a plurality of third segments and a plurality of third connecting portions. The plurality of third segments forms a ring structure through the plurality of third connecting portions, in order to couple the first coil and the second coil. A first portion of the plurality of first segments and a second portion of the plurality of second segments are arranged in a range of the ring structure, the first portion of the plurality of first segments is arranged in a range of the second coil, and the second portion of the plurality of second segments is arranged in a range of the first coil.

These and other objectives of the present disclosure will no doubt become obvious to those of ordinary skill in the art after reading the following detailed description that are illustrated in the various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, “about” or “substantially” shall generally mean within 20 percent, preferably within 10 percent, and more preferably within 5 percent of a given value or range. Numerical quantities given herein are approximate, meaning that the term “about” or “substantially” can be inferred if not expressly stated.

Further, for ease of description, spatially relative terms, such as “left,” “right,” “lower,” “upper,” “below,” “over,” and the like, may be used herein to describe one element or feature’s relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In this document, the term “coupled” may also be termed as “electrically coupled,” and the term “connected” may be termed as “electrically connected.” “Coupled” and “connected” may mean “directly coupled” and “directly connected” respectively, or “indirectly coupled” and “indirectly connected” respectively. “Coupled” and “connected” may also be used to indicate that two or more elements cooperate or interact with each other. In this document, the term “circuit” may indicate an object, which is formed with one or more transistors and/or one or more active/passive elements based on a specific arrangement, for processing signals.

As used herein, the term “and/or” includes any and all combinations of one or more of the associated listed items. Although the terms “first,” “second,” etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1A:
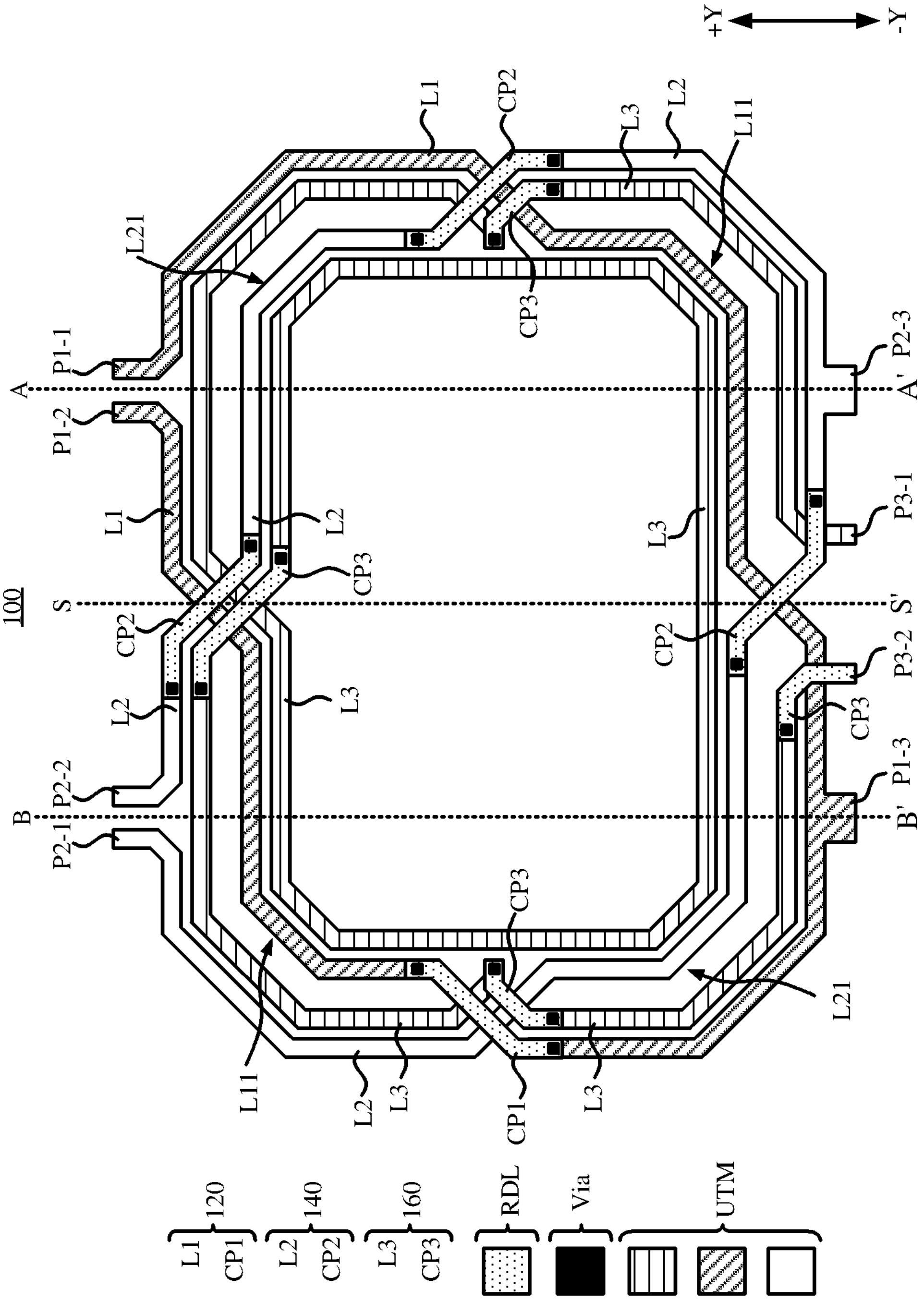
FIG. 1A is a schematic diagram of a transformer device according to some embodiments of the present disclosure.
Figure 1B:
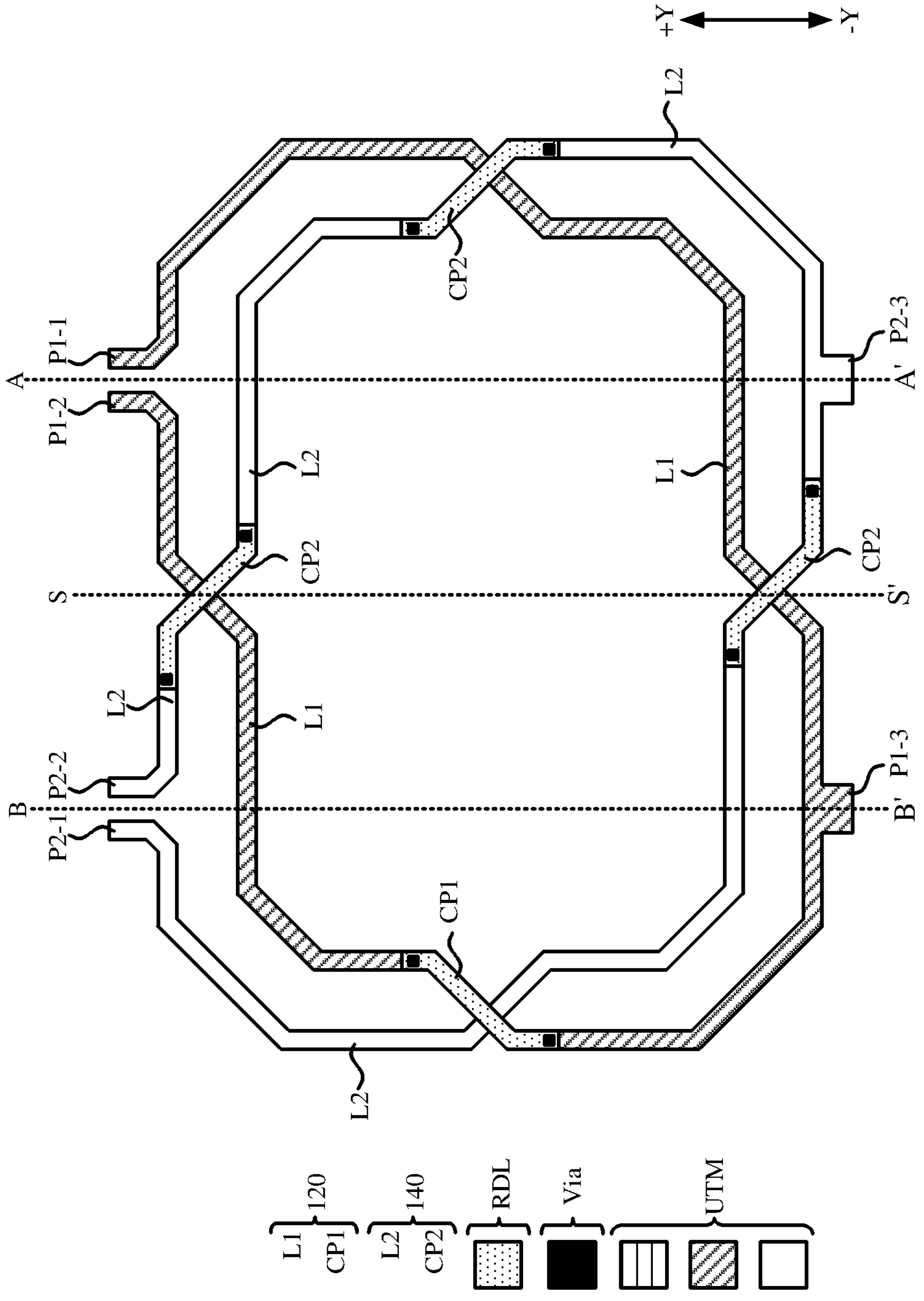
FIG. 1B is a schematic diagram of two coils in FIG. 1A according to some embodiments of the present disclosure.
Figure 1C:
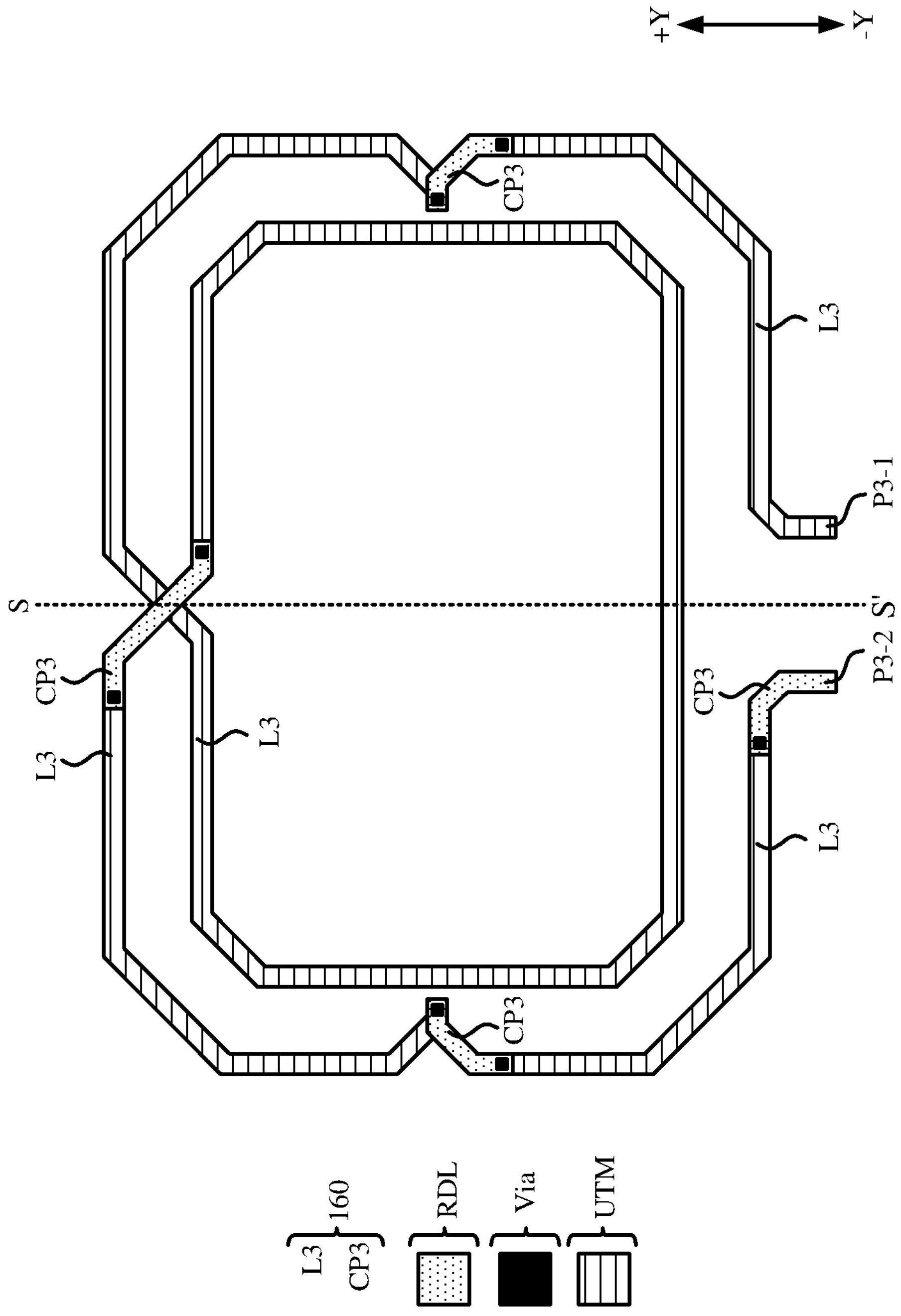
FIG. 1C is a schematic diagram of a coil in FIG. 1A according to some embodiments of the present disclosure.

Reference is made to FIG. 1A to FIG. 1C, FIG. 1A is a schematic diagram of a transformer device 100 according to some embodiments of the present disclosure, FIG. 1B is a schematic diagram of a coil 120 and a coil 140 in FIG. 1A according to some embodiments of the present disclosure, and FIG. 1C is a schematic diagram of the coil 160 in FIG. 1A according to some embodiments of the present disclosure. In some embodiments, the transformer device 100 may operate (but not limited to) as a power combiner, which may couple signals from two symmetrical coils to a single coil, in order to output a single signal. For ease of understanding, components in the transformer device 100 are separately shown in FIG. 1B and FIG. 1C. In some embodiments, the transformer device 100 is formed with the coils 120, 140, and 160 shown in FIG. 1B and FIG. 1C.

Each of the coil 120 and the coil 140 may be a planar coil. As shown in FIG. 1B, the coil 120 includes segments L1 (shown in diagonal stripes) and a connecting portion CP1 (shown in dots). The segments L1 are coupled to each other through the connecting portion CP1, in order to form the coil 120. For example, at least one via (shown in black) is arranged on each of two terminals of the connecting portion CP1, in order to couple the connection portion CP1 to the corresponding segment L1. Similarly, the coil 140 includes segments L2 (shown in white) and connecting portions CP2 (shown in dots). The segments L2 are coupled to each other through the connecting portions CP2, in order to form the coil 140. For example, at least one via is arranged on each of two terminals of each connecting portion CP2, in order to couple the connecting portion CP2 to the corresponding segment L2.

In some embodiments, each of the coil 120 and the coil 140 may operate as a differential inductor. For example, the coil 120 includes a terminal P1-1, a terminal P1-2, and a terminal P1-3. The terminal P1-1 and the terminal P1-2 may output (or receive) a set of differential signals. In some embodiments, the terminal P1-3 may be a middle point between the terminal P1-1 and the terminal P1-2. In other words, a wire length between the terminal P1-1 and the terminal P1-3 is substantially the same as that between the terminal P1-2 and the terminal P1-3. In some embodiments, the terminal P1-3 may be configured to receive a common mode voltage (e.g., an AC ground voltage). In some embodiments, the terminal P1-3 may operate as a center tap terminal.

Similarly, the coil 140 includes a terminal P2-1, a terminal P2-2, and a terminal P2-3. The terminal P2-1 and the terminal P2-2 may output (or receive) a set of differential signals. In some embodiments, the terminal P2-3 may be a middle point between the terminal P2-1 and the terminal P2-2. In other words, a wire length between the terminal P2-1 and the terminal P2-3 is substantially the same as that between the terminal P2-2 and the terminal P2-3. In some embodiments, the terminal P2-3 may be configured to receive a common mode voltage (e.g., an AC ground voltage). In some embodiments, the terminal P2-3 may operate as a center tap terminal.

In some embodiments, the terminal P2-3 is arranged in a central location between the terminal P1-1 and the terminal P1-2. For example, a reference line A-A' is presented at the central location between the terminal P1-1 and the terminal P1-2, and the terminal P2-3 is on the reference line A-A'. Similarly, the terminal P1-3 is arranged in a central location between the terminal P2-1 and the terminal P2-2. For example, a reference line B-B' is presented between the central location between the terminal P2-1 and the terminal P2-2, and the terminal P1-3 is on the reference line B-B'. In some embodiments, a reference line S-S' is presented between the coil 120 and the coil 140, such that the coil 120 and the coil 140 are substantially mirror images of each other with respect to the reference line S-S'. It is understood that, the reference line S-S' is substantially arranged at a central location between the coil 120 and the coil 140, and the reference line A-A', the reference line B-B', and the reference line S-S' are not physical components in the transformer device 100.

The coil 160 may be a planar inductor, which is configured to couple the coil 120 and the coil 140. As shown in FIG. 1C, the coil 160 includes segments L3 (shown in horizontal stripes) and connecting portion CP3 (shown in dots). The segments L3 are coupled to each other through the connecting portions CP3, in order to form a ring structure having two turns. For example, at least one via is arranged on each of two terminals of certain connecting portions CP3, in order to couple the connecting portions CP3 to the corresponding segments L3. The coil 160 may be applied to (but not limited to) a single-ended signaling. For example, the coil 160 includes a terminal P3-1 and a terminal P3-2. The terminal P3-1 may receive a single-end signal, and the terminal P3-2 may receive a DC voltage (e.g., a common mode voltage or a ground voltage), in which the terminal P3-2 may be formed with one connecting portion CP3. In some embodiments, the ring structure of the coil 160 has a mirror image symmetry with respect to the reference line S-S'. In other words, as shown in FIG. 1A, the transformer device 100 substantially has a bilateral symmetry structure.

As shown in FIG. 1B and FIG. 1C, in some embodiments, the segments L1, the segments L2, and the segments L3 may be implemented with a first metal layer, the connecting portion CP1, the connecting portions CP2, and the connecting portions CP3 may be implemented with a second metal layer, and the first metal layer is different from the second metal layer. For example, the first metal layer may be (but not limited to) an ultra-thick metal (UTM) layer, and the second metal layer may be (but not limited to) a re-distribution layer (RDL).

Reference is now made to FIG. 1A to FIG. 1C, a first portion L11 of the segments L1 and a second portion L21 of segments L2 are arranged in a range of the ring structure in FIG. 1C. For example, the first portion L11 and the second portion L21 are arranged between an innermost turn and an outermost turn of the ring structure in FIG. 1C. The first portion L11 is arranged in a range of the coil 140, and the second portion L21 is arranged in a range of the coil 160. With the above arrangements, the ring structure of the coil 160 is able to couple the coil 120 and the coil 140. As a result, a signal received by the coil 160 may be simultaneously coupled to the coil 140 and the coil 120, in order to output two sets of differential signals. Alternatively, differential signals received by the coil 140 and the coil 120 may be coupled to the coil 160, in order to be combined as a single signal.

In some embodiments, the terminal P1-1, the terminal P1-2, the terminal P2-1, and the terminal P2-2 are all arranged outside of the outermost turn of the ring structure in FIG. 1C. In greater detail, the terminal P1-1, the terminal P1-2, the terminal P2-1 and the terminal P2-2 are arranged at a first side of the ring structure, the terminal P3-1 and the terminal P3-2 are arranged at a second side (which is opposite to the first side) of the ring structure. For example, the first side may be a side along a direction of +Y, and the second side along a direction of −Y. The arrangements of each terminal are given for illustrative purposes, and the present disclosure is not limited thereto.

The segments L1 may be coupled from the terminal P1-1 to the terminal P1-2 in a clockwise direction through the connecting portion CP1 and may be arranged over the outermost turn of the ring structure for three times. For example, starting from the terminal P1-1, the segments L1 and the connecting portion CP1 may be sequentially arranged over a rightmost turn of the ring structure, the terminal P3-2, and a leftmost turn of the ring structure, in order to be coupled to the terminal P1-2. As shown in FIG. 1A, in the coil 120, from the terminal P1-1 to the terminal P1-2, the segments L1 and the connecting portion CP1 sequentially form about a quarter of an outer turn, about a quarter of an inner turn, about a quarter of the outer turn, and about a quarter of the inner turn. These inner turns are diagonally arranged, and these outer turns are diagonally arranged.

Similarly, the segments L2 may be coupled from the terminal P2-1 to the terminal the terminal P2-2 in a counterclockwise direction through the connecting portions CP2 and may be arranged over the outermost turn of the ring structure for three times. For example, starting from the terminal P2-1, the segments L2 and the connecting portions CP2 may be sequentially arranged over the leftmost outer turn of the ring structure, the terminal P3-1, and the rightmost outer turn of the ring structure, in order to be coupled to the terminal P2-2. As shown in FIG. 1A, in the coil 140, from the terminal P2-1 to the terminal P2-2, the segments L2 and the connecting portions CP2 sequentially form about a quarter of an outer turn, about a quarter of the inner turn, about a quarter of the outer turn, and about a quarter of the inner turn. These inner turns are diagonally arranged, and these outer turns are diagonally arranged.

With such arrangements, the first portion L11 of segments L1 and the second portion L21 of the segments L2 may be arranged between the outmost turn and the innermost turn of the ring structure. The first portion L11 of the segments L1 may be arranged in a range of the coil 140. For example, the first portion L11 (which may be, for example, two quarters of the inner turn of the coil 120 are arranged in the outer turn of the coil 140. The second portion L21 of the segments L2 may be arranged in a range of the coil 120. For example, the second portion L21 (which may be two quarters of the inner turns in the coil 140) is arranged in the outer turn of the coil 120. As a result, a wire length of the coil 120 may be substantially the same as that of the coil 140, in order to output two more matching differential signals.

In some embodiments, as shown in FIG. 1B and FIG. 1C, each of the coil 120 and the coil 140 has a one-turn winding (e.g., a combination of the aforementioned two-quarters of the inner turn and two-quarters of the outer turn), and the coil 160 has a two-turn winding. Therefore, a turns ratio among the coil 160, the coil 120, and the coil 140 is 2:1:1. It is understood that, figures of the present disclosure are given for illustrative purposes, and the present disclosure is not limited thereto. The number of turns in each of the coil 120, the coil 140, and the coil 160 may be adjusted correspondingly according to practical requirements.

Figure 2A:
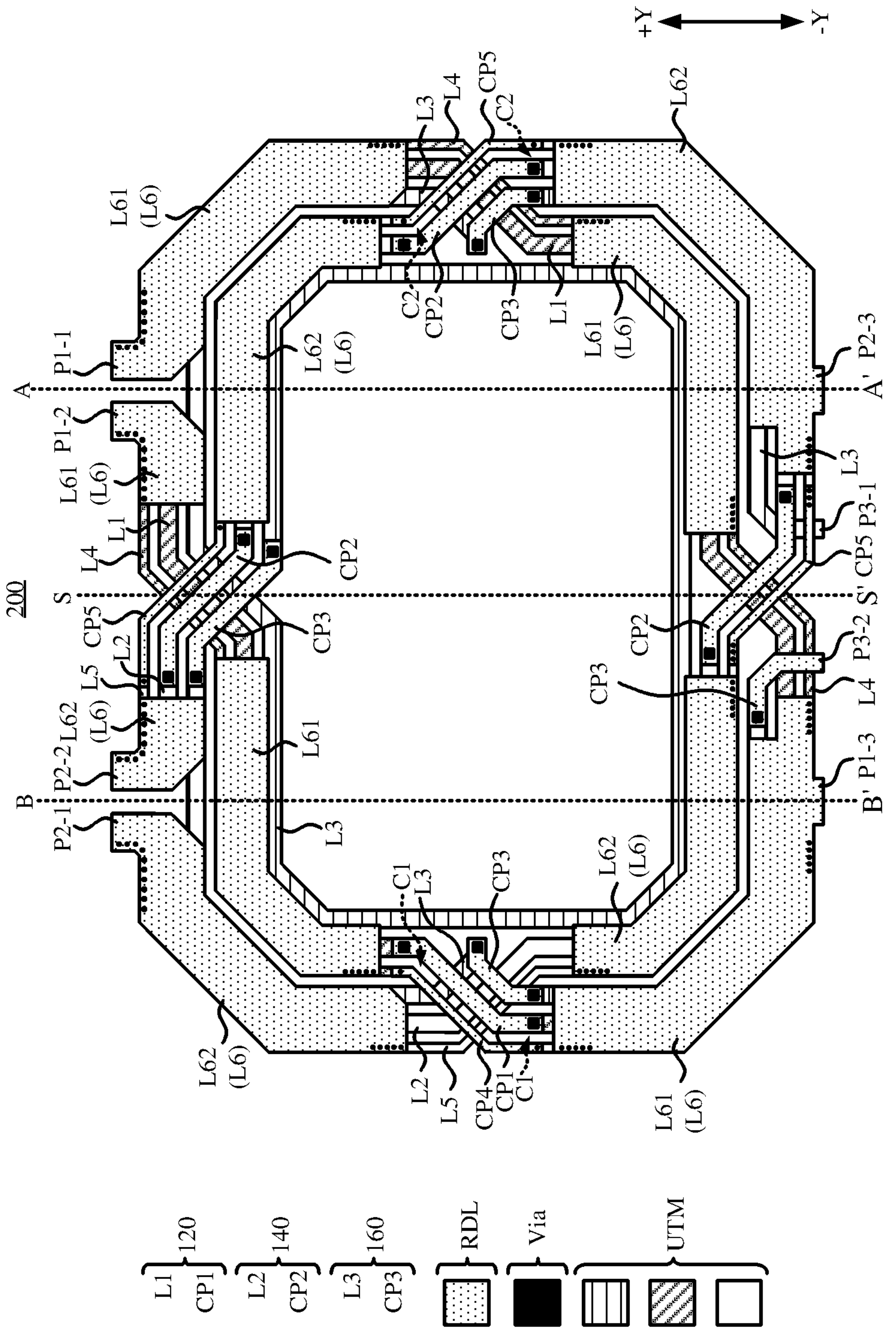
FIG. 2A is a schematic diagram of a transformer device according to some embodiments of the present disclosure.
Figure 2B:
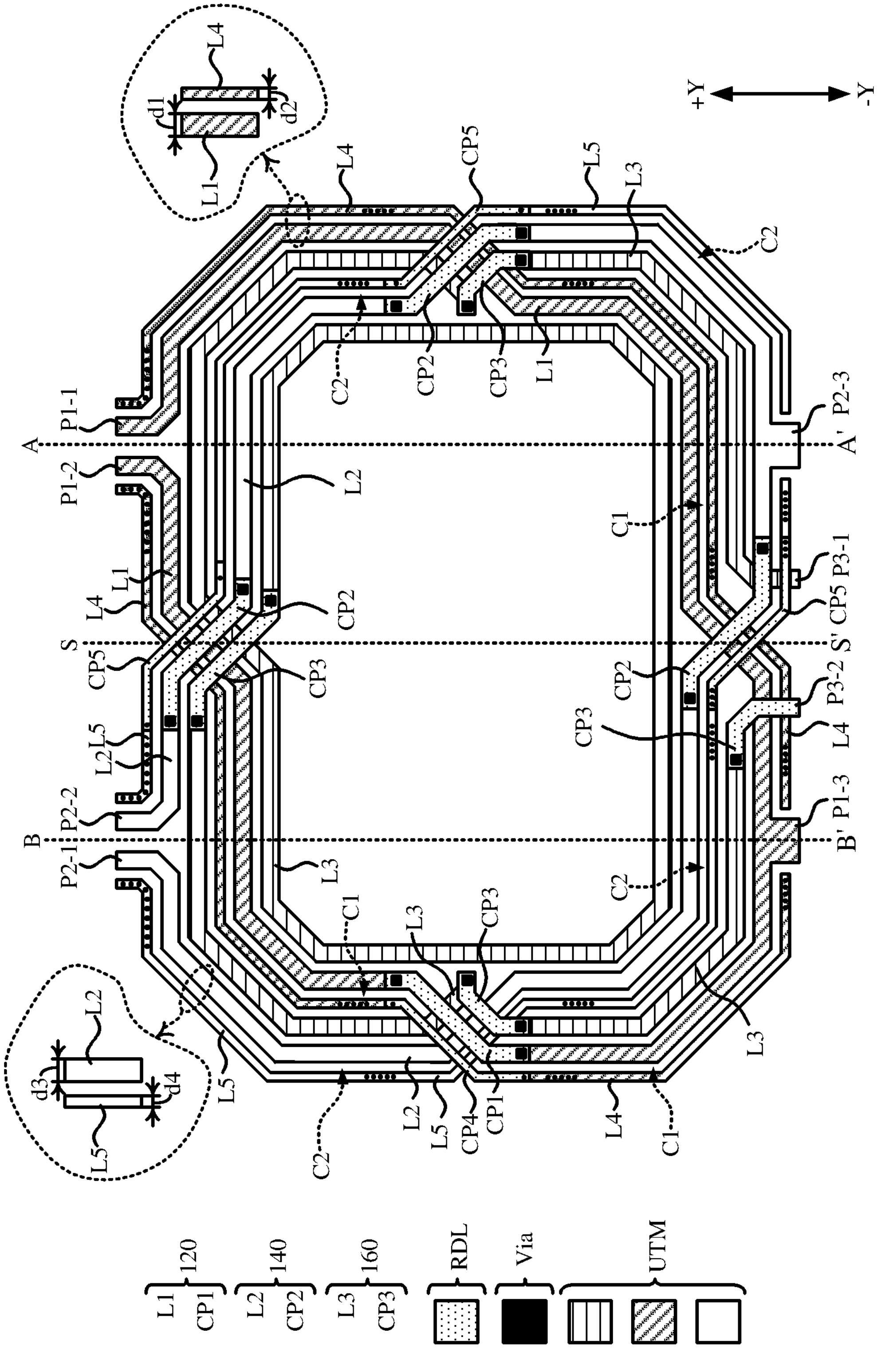
FIG. 2B is a schematic diagram of certain segments in FIG. 2A according to some embodiments of the present disclosure.
Figure 2C:
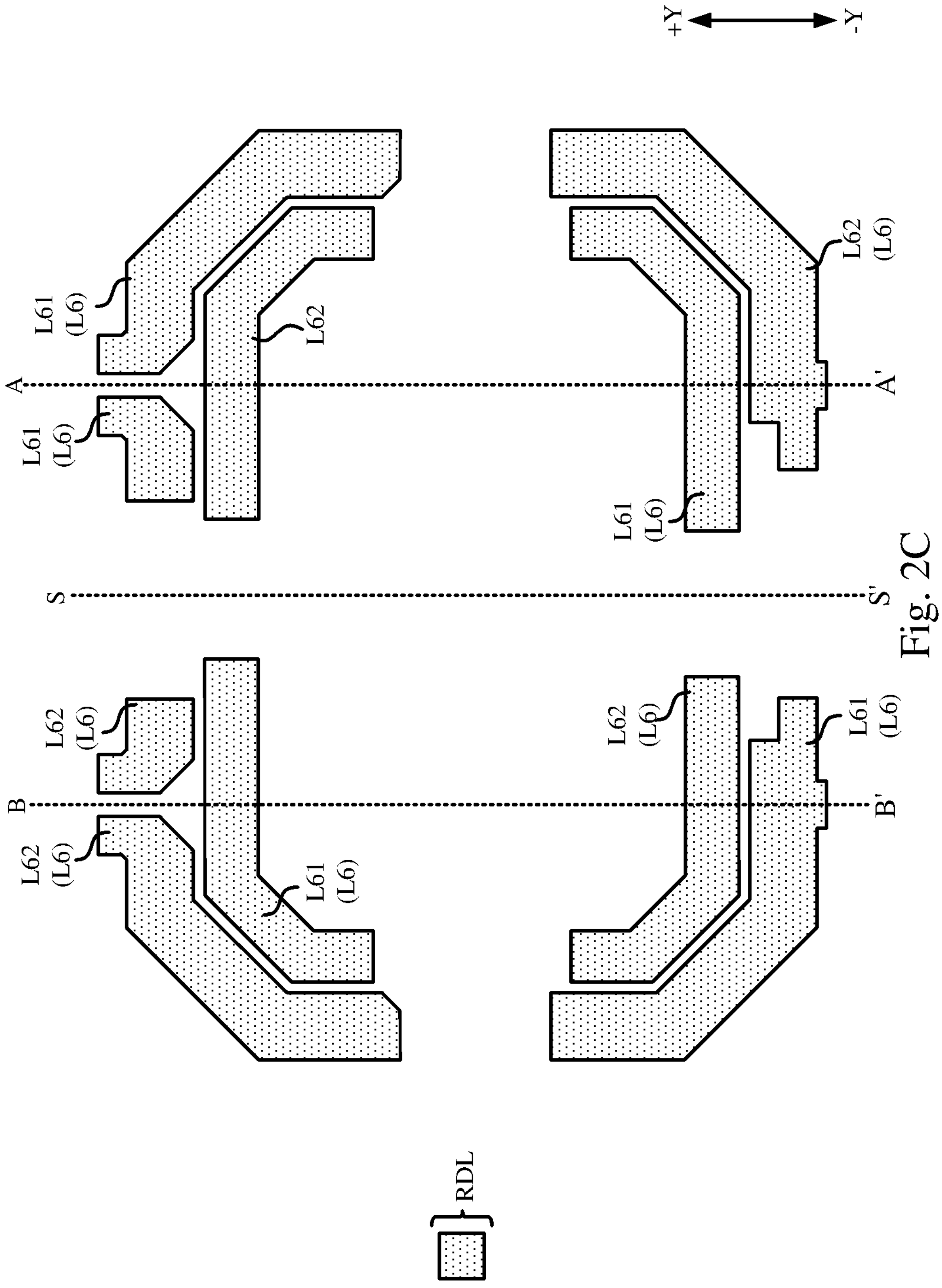
FIG. 2C is a schematic diagram of certain segments in FIG. 2A according to some embodiments of the present disclosure.

Reference is made to FIG. 2A to FIG. 2C. FIG. 2A is a schematic diagram of a transformer device 200 according to some embodiments of the present disclosure, FIG. 2B is a schematic diagram of certain segments in FIG. 2A according to some embodiments of the present disclosure, and FIG. 2C is a schematic diagram of certain segments in FIG. 2A according to some embodiments of the present disclosure. Compared with FIG. 1A, the transformer device 200 further includes segments L4, a connecting portion CP4, segments L5, connecting portion CP5, and segments L6. For ease of illustration, components included in the transformer device 200 are illustrated in FIG. 2B and FIG. 2C respectively. In some embodiments, the transformer device 200 may be formed with the coil 120, the coil 140, the coil 160, the segments L4, the connecting portion CP4, the segments L5, capacitors C1-C2, the connecting portions CP5, and the segments L6 in FIG. 2C.

As shown in FIG. 2B, the segments L4 (shown in diagonal stripes) and the connecting portion CP4 (shown in dots) are substantially arranged adjacent to the segments L1 and the connecting portion CP1. For example, the segment L4 are arranged adjacent to the segments L1 and outside of the coil 120. The connecting portion CP4 is arranged adjacent to the connecting portion CP1 and is configured to couple the segments L4 to each other. For example, at least one via is arranged on each of two terminals of the connecting portion CP4, in order to couple the segments L4. In some embodiments, a wire width of each of the segments L1 is greater than a wire width d2 of each of the segments L4, but the present disclosure is not limited thereto. In different embodiments, the wire width d1 may be greater than, equal to, or less than the wire width d2. In some embodiments, the segments L4 may be configured to receive each of a first predetermined voltage (e.g., a system high voltage) and a second predetermined voltage (e.g., a system low voltage or a ground voltage), and the segments L1 may be configured to receive another one of the first predetermined voltage and the second predetermined voltage.

Similarly, the segments L5 and the connecting portions CP5 are substantially arranged adjacent to the segments L2 and the connecting portions CP2. For example, the segments L5 are arranged adjacent to the segments L2 and arranged outside of the coil 140. The connecting portions CP5 are respectively arranged adjacent to the connecting portions CP2 and configured to couple the segments L5. For example, at least one via is arranged on each of two terminals of the connecting portions CP5, in order to couple the segments L5. In some embodiments, a wire width d3 of each segment L2 is greater than a wire width d4 of each segment L5, but the present disclosure is not limited thereto. In different embodiments, the wire width d3 may be greater than, equal to, or less than the wire width d4. In some embodiments, the segments L5 may be configured to receive one of the first predetermined voltage and the second predetermined voltage, and the segments L2 may be configured to receive another one of the first predetermined voltage and the second predetermined voltage. In some embodiments, the segments L4 and the segments L5 may be implemented with the UTM layer, and the connecting portion CP4 and the connecting portions CP5 may be implemented with the RDL.

As shown in FIG. 2C, the segments L6 (shown in dots) includes a first portion L61 and a second portion L62. The portion L61 is coupled to the segments L4. For example, as shown in FIG. 2B, vias (or at least one via) are arranged on each segment L4, in order to couple the segment L4 to corresponding segments in the first portion L61. The second portion L62 is coupled to the segments L5. For example, as shown in FIG. 2B, vias (or at least one via) are arranged on each segment L5, in order to couple the segment L5 to corresponding segments in the second portion L62. As shown in FIG. 2A, after structures in FIG. 2B and FIG. 2C are combined, the first portion L61 partially overlaps the segments L4, the segments L1, and the segments L3, and the second portion L62 partially overlaps the segments L5, the segments L2, and the segments L3.

As shown in FIG. 2B, in some embodiments, the transformer device 200 further includes capacitors C1 and capacitors C2. For ease of illustration, FIG. 2A and FIG. 2B only point out locations where the capacitors C1 and the capacitors C2 are placed, and the present disclosure is not limited to a number of capacitors in FIG. 2A or FIG. 2B. The capacitors C10 are arranged along and below the segments L1 and the segments L4, and, in order to couple the segments L1 and the segments L4. The capacitors C2 are arranged along and below the segments L2 and the segments L5, in order to couple the segments L2 and the segments L5.

Figure 2D:
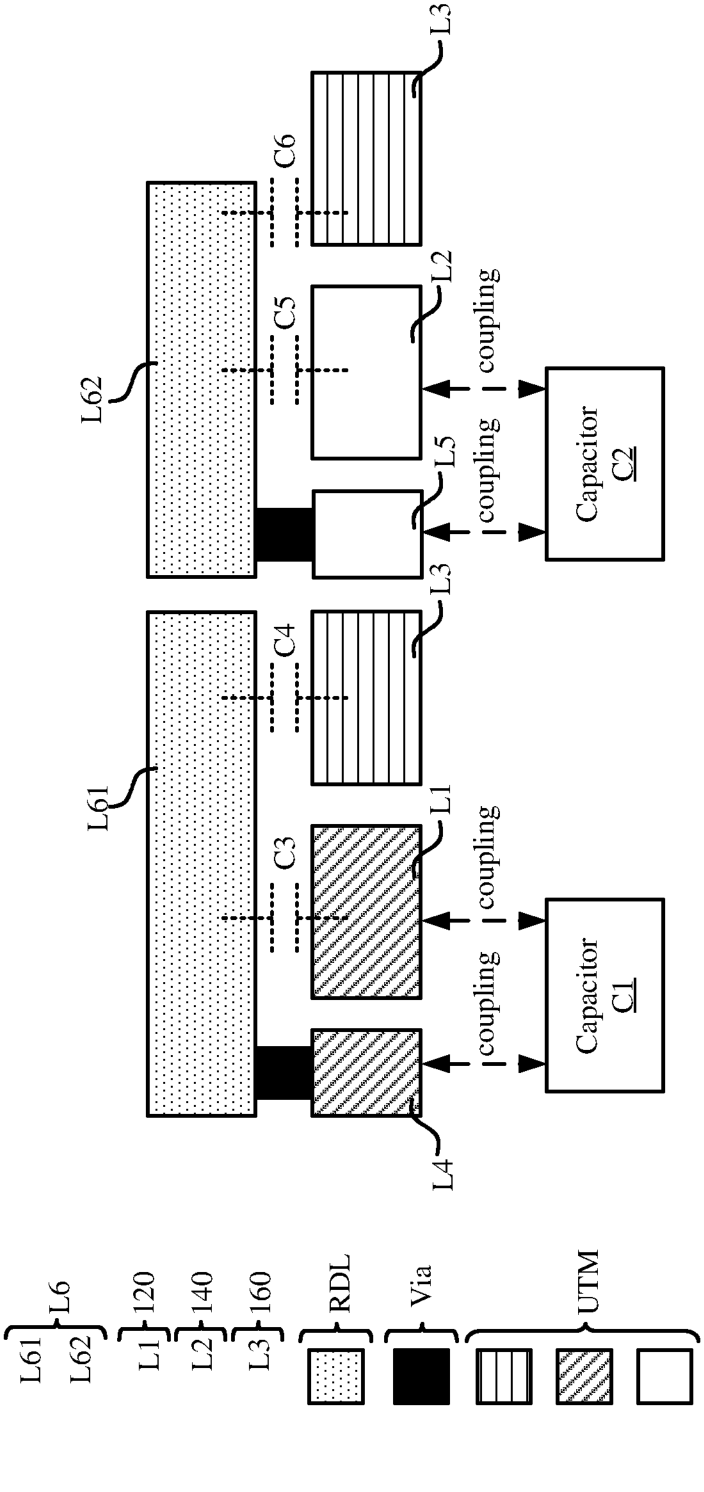
FIG. 2D is a schematic diagram of a side view of the coils in FIG. 2A or FIG. 2B according to some embodiments of the present disclosure.

For ease of understanding, reference is made to FIG. 2D, and FIG. 2D is a schematic diagram of a side view of the coil 120 and the coil 140 in FIG. 2A or FIG. 2B according to some embodiments of the present disclosure. For ease of understanding, FIG. 2D shows an arrangement among one capacitor C1, one capacitor C2, the segments L1-L6, and the connecting portions L1-L6. The capacitors C1 and C2 are arranged at a first side of the segments L1-L5 (e.g., below the segments L1-L5), and the segments L6 are arranged at a second side of the segments L1-L5 (e.g., over the segments L1-L5). The capacitor C1 is arranged below the segments L1 and L4, in order to couple the segments L1 and L4. Similarly, the capacitor C2 is under the segments L2 and L5, in order to couple the segments L2 and L5. In some embodiments, the capacitor C1 and the capacitor C2 may be (but not limited to) metal-insulator-metal (MIM) capacitors, metal-oxide-metal (MOM) capacitors, or capacitors implemented with transistors. As the capacitor C1 presents a low impedance to AC signal(s), the AC signal(s) may be transmitted to the segments L4 (or L1) via a signal path formed with the capacitor C1 when the segments L1 (or L4) receive the AC signal(s). Similarly, as the capacitor C2 presents a low impedance to the AC signal(s), the AC signal(s) may be transmitted to the segments L5 (or L2) via a signal path formed with the capacitor C2 when the segments L2 (or L5) receive the AC signal(s). In other words, with the capacitors C1 and C2, it is able to improve the AC-coupling ability of the coil 120 and the coil 140. As a result, according to practical applications, it is able to increase the AC signal transmission ability of the coil 120 and the coil 140, or to increase a noise cancellation ability of the coil 120 and the coil 140.

The portion L61 partially overlaps the segments L4, L1, and L3. With such arrangements, a capacitor C3 is formed between the first portion L61 and the segments L1, in order to couple the coil 120. A capacitor C4 is formed between the portion L61 and the segments L3, in order to increase the coupling between the coil 120 and the coil 160. Similarly, the second portion L62 partially overlaps the segments L5, L2, and L3. As a result, a capacitor C5 is formed between the second portion L62 and the segments L2, in order to couple the coil 140. A capacitor C6 is formed between the second portion L62 and the segments L3, in order to increase the coupling between the coil 140 and the coil 160. As a result, it is able to further increase the AC signal transmission ability of the coil 120 and the coil 140, or to increase the noise cancellation ability of the coil 120 and the coil 140. In some other embodiments, more vias may be arranged on the segments L1 (and/or the segments L2), in order to couple the corresponding segments L1 (and/or the corresponding segments L2) to the segments L6.

Figure 3:
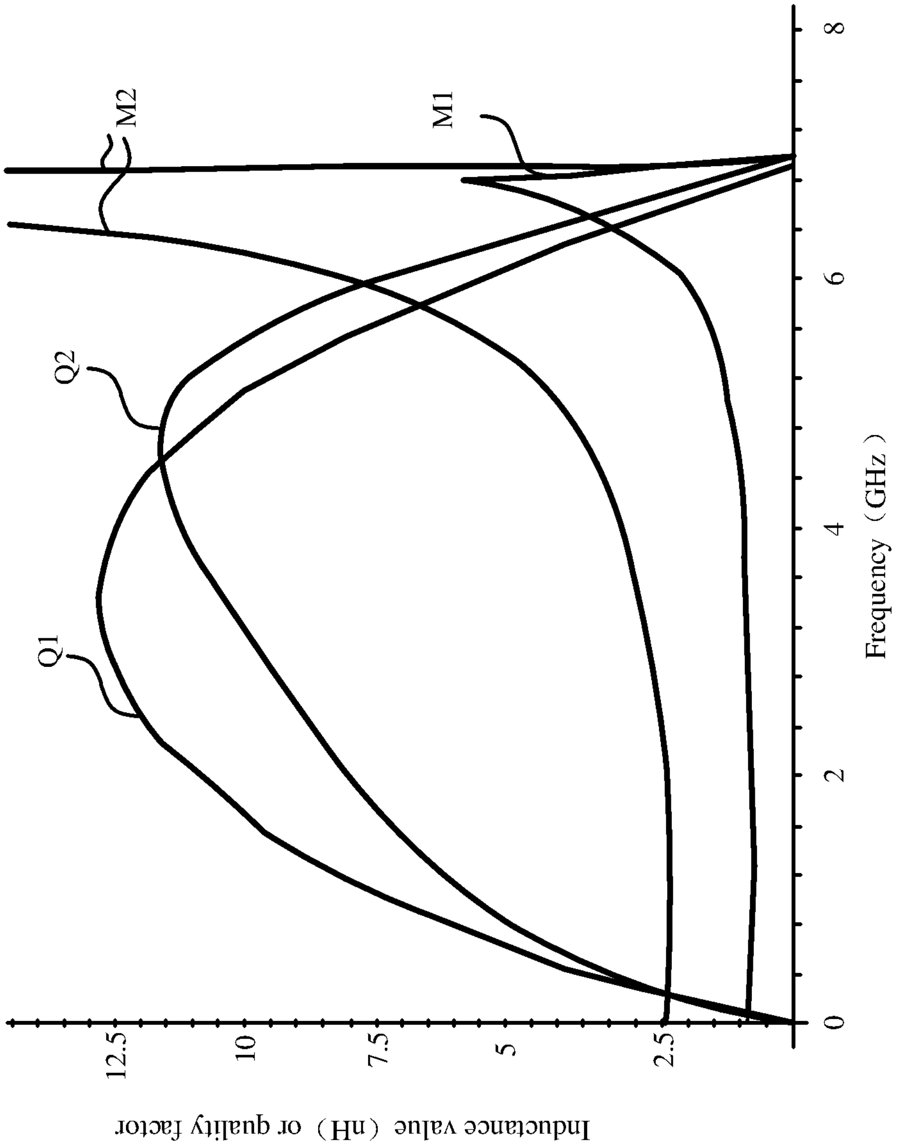
FIG. 3 is an experimental result of the transformer device in FIG. 2A according to some embodiments of the present disclosure.

FIG. 3 is an experimental result of the transformer device 200 in FIG. 2A according to some embodiments of the present disclosure. A curve Q1 corresponds to a quality factor of the coil 160, a curve Q2 corresponds to a quality factor of the coil 120 (or the coil 140), a curve M1 corresponds to an inductance value of the coil 160, and a curve M2 corresponds to an inductance value of the coil 120 (or the coil 140). When being employed in a 2.5 GHz application, the inductance value of the coil 160 is about 2.857 nH, and the coil 160 has the quality factor having a value of about 12.4831. The inductance value of the coil 120 (or the coil 140) is about 0.8199 nH, and the coil 120 (or the coil 140) has the quality factor having a value of about 9.3953. In other words, in examples of FIG. 2A, a ratio between the inductance value of the coil 160 and that of the coil 120 (or the coil 140) is about 3:1. The above values are given for illustrative purposes, and the present disclosure is not limited thereto.

The above implementations (e.g., a number of turns, materials, a number of terminals, shapes, etc.) and application examples about the above transformer devices are given for illustrative purposes, and the present disclosure is not limited thereto. For example, the shape of the coil 120, the coil 140, and the coil 160 may be other polygons or circle. The number of turns in the coil 120, the coil 140, and the coil 160, or a wire distance between segments can be adjusted according to practical requirement.

As described above, the transformer device in some embodiments of the present disclosure may utilize three coils to implement an inductor structure having mirror-symmetry. As a result, the transformer device may achieve a better wire balance, in order to be applied to a power combiner, a balance-to-unbalance conversion, an unbalance-to-balance conversion, and so on. Moreover, according to different applications, the transformer device may further utilize capacitors to improve the AC signal coupling ability or the noise cancellation ability.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A transformer device, comprising:

a first coil comprising a plurality of first segments and a first connecting portion, wherein the plurality of first segments are coupled to each other through the first connecting portion;

a second coil comprising a plurality of second segments and a plurality of second connecting portions, wherein the plurality of second segments are coupled to each other through the plurality of second connecting portions;

a third coil comprising a plurality of third segments and a plurality of third connecting portions, wherein the plurality of third segments forms a ring structure through the plurality of third connecting portions, in order to couple the first coil and the second coil, wherein a first portion of the plurality of first segments and a second portion of the plurality of second segments are arranged in a range of the ring structure, the first portion of the plurality of first segments is arranged in a range of the second coil, and the second portion of the plurality of second segments is arranged in a range of the first coil;

a plurality of fourth segments arranged adjacent to the plurality of first segments and outside the first coil;

a plurality of first capacitors arranged at a first side of the plurality of first segments and the plurality of second segments, and configured to couple the first segments and the plurality of fourth segments;

a fourth connecting portion arranged adjacent to the first connecting portion, and configured to couple the plurality of fourth segments;

a plurality of fifth segments arranged adjacent to the plurality of second segments and outside the second coil;

a plurality of second capacitors arranged at a second side of the plurality of first segments and the plurality of second segments, and configured to couple the plurality of second segments and the plurality of fifth segments;

a plurality of fifth connecting portions configured to couple the plurality of fifth segments; and a plurality of sixth segments arranged at the first side of the plurality of first segments and the plurality of second segments, wherein a first portion of the plurality of sixth segments is coupled to the plurality of fourth segments and partially overlaps the plurality of first segments, and a second portion of the plurality of sixth segments is coupled to the plurality of fifth segments and partially overlaps the plurality of second segments.

2. The transformer device of claim 1, wherein the plurality of first segments, the plurality of second segments, and the plurality of third segments are implemented with a first metal layer, the first connecting portion, the plurality of second connecting portions, and the plurality of third connecting portions are implemented with a second metal layer, and the first metal layer is different from the second metal layer.

3. The transformer device of claim 1, wherein the first portion of the plurality of first segments and the second portion of the plurality of second segments are arranged between an innermost turn and an outermost turn of the ring structure.

4. The transformer device of claim 1, wherein the plurality of first segments comprise a first terminal and a second terminal, the first terminal and the second terminal are arranged outside of an outermost turn of the ring structure, the plurality of first segments are coupled from the first terminal to the second terminal in a clockwise direction through the first connecting portion and arranged over the outermost turn for three times.

5. The transformer device of claim 4, wherein the second coil comprises a middle point, and the middle point is arranged at a central location between the first terminal and the second terminal.

6. The transformer device of claim 1, wherein the second coil comprises a first terminal and a second terminal, the first terminal and the second terminal are arranged outside of an outermost turn of the ring structure, and the plurality of second segments are coupled from the first terminal to the second terminal in a counterclockwise direction through the plurality of second connecting portions and arranged over the outermost turn for three times.

7. The transformer device of claim 6, wherein the first coil comprises a middle point, and the middle point is arranged at a central location between the first terminal and the second terminal.

8. The transformer device of claim 1, wherein the first portion of the plurality of sixth segments and the plurality of first segments are configured to form a third capacitor, in order to couple the first coil.

9. The transformer device of claim 1, wherein the second portion of the plurality of sixth segments and the plurality of second segments are configured to form a fourth capacitor, in order to couple the second coil.

10. The transformer device of claim 1, wherein the first side and the second side are opposite sides of the plurality of first segments and the plurality of second segments.

11. The transformer device of claim 1, wherein the plurality of fourth segments and the plurality of fifth segments are implemented with a first metal layer, and the fourth connecting portion, the plurality of fifth connecting portions, and the plurality of sixth segments are implemented with a second metal layer.

12. The transformer device of claim 1, wherein the plurality of sixth segments partially overlap the plurality of third segments.

13. The transformer device of claim 12, wherein the plurality of sixth segments and the plurality of third segments are configured to form a plurality of capacitors.

14. The transformer device of claim 1, wherein a wire width of each of the plurality of first segments is greater than a wire width of each of the plurality of fourth segments.

15. The transformer device of claim 1, wherein a wire width of each of the plurality of second segments is greater than a wire width of each of the plurality of fifth segments.

16. The transformer device of claim 1, wherein a turns ratio among the third coil, the first coil, and the second coil is 2:1:1.

17. The transformer device of claim 1, wherein each of the first coil and the second coil is configured to output a set of differential signals, and the third coil is configured to receive a single-end signal.

18. The transformer device of claim 1, wherein the first coil and the second coil are substantially mirror images of each other.

* * * * *